Figure 1:
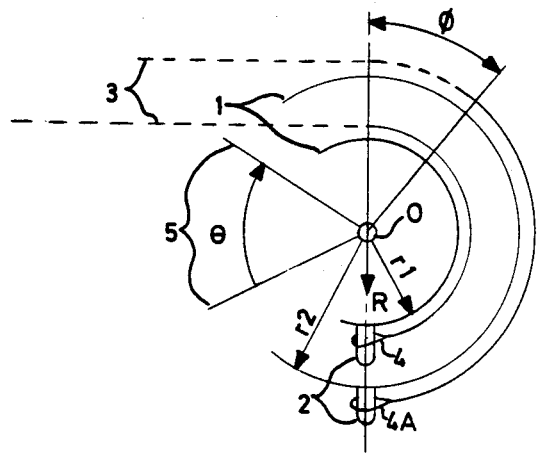

United States Patent [19]

Weir

[11] Patent Number: 4,759,739

[45] Date of Patent: Jul. 26, 1988

[54] EXPANSIBLE CHAINWHEEL VARIABLE RATIO MECHANICAL DRIVE

[76] Inventor: Wilfred J. Weir, 215 Essex Street, Sarnia, Ontario, Canada, N7T 4S1

[21] Appl. No.: 664,173

[22] Filed: Oct. 24, 1984

[51] Int. Cl.$^4$ .............. F16H 55/54; F16H 9/00; F16H 11/06; F16H 55/30

[52] U.S. Cl. ......................... 474/49; 474/50; 474/56

[58] Field of Search ..................... 474/47–51, 474/56

[56] References Cited

U.S. PATENT DOCUMENTS

| | | | |
|---|---|---|---|
| 1,692,091 | 11/1928 | Murray | 474/50 |
| 1,776,339 | 9/1930 | Siqueland | 474/50 |
| 3,850,044 | 11/1974 | Hagen | 474/56 |
| 3,850,045 | 11/1974 | Hagen | 474/56 |
| 3,867,851 | 2/1975 | Gregory et al. | 474/56 |
| 4,068,539 | 1/1978 | Nyc | 474/50 |
| 4,478,594 | 10/1984 | Gayer | 474/50 |
| 4,501,574 | 2/1985 | Miro | 474/49 |
| 4,516,960 | 5/1985 | Rathert | 474/49 |
| 4,529,394 | 7/1985 | Miro | 474/49 |

Primary Examiner—John Petrakes
Attorney, Agent, or Firm—McCarthy & McCarthy

[57] ABSTRACT

A variable ratio transmission includes an input and an output, having an expansible chainwheel. A first drive path is provided to rotate the chainwheel and a second drive path is provided to increase the diameter of the chainwheel upon application of a first input torque and to decrease the diameter of the chainwheel upon application of a second input torque of opposite sense to the first input torque. The first and second drive paths are connected to the input so that the second drive path has a mechanical advantage over the first to provide an increase in diameter of the chainwheel prior to its rotation.

9 Claims, 5 Drawing Sheets

EXPANSIBLE CHAINWHEEL VARIABLE RATIO MECHANICAL DRIVE

This invention relates to a non-traction type of input-torque sensitive mechanical drive whose ratio can be continuously varied within its range. This invention is applicable to stationary and mobile machinery. In an all-mechanical embodiment because of its compactness, it is particularly suitable for chain-driven bicycles, and in a mechanical-hydro-static embodiment because of its low running losses and automatic back-driving, it is suitable for internal combustion (IC) engine powered railway locomotives.

Known transmissions of the continuously variable effective diameter disc type currently in use have a number of disadvantages. One known type utilising an expansible chainwheel with plurality of peripheral sprockets is shown in U.S. Pat. Nos. 3,850,044 to Hagen; 3,850,045 to Hagen; and 3,867,851 to Gregory et al. This chain type drive moves a plurality of peripheral driver sprocket axles in radial guideways let into a rotatable plate. Each axle is positioned in its guideway by means of a commonly mounted companion scroll plate. The effective pitch diameter of the chainwheel is changed by relative movement between the radially slotted plate and the scroll plate. The locking of the sprockets to the axle during driving and unlocking during outward movement in the radial guideways is achieved by an axle-mounted backstop clutch in one arrangement, and by spring-centred rotatable teeth segments in another arrangement. Although the device is infinitely variable within its range, the effective chainwheel diameter desired must be selected by hand and foot controls.

Another type of known device utilises a V-belt with spring-actuated axially movable pulley flanges. The ratio of the well-known traction type belt drive is sensitive to changes in input torque and load, and the drive is infinitely variable within its range. It is widely used in variable speed service with an electric motor input, but it has not been widely used in mobile service because it is bulky and has poor low-speed,high-torque characteristics.

In the present application the term "external power train ratio" is defined as the ratio between:

the angle through which the input element rotates, for example, the pedal arm of a bicycle, and the resultant angle through which the driven output element rotates, for example, a fixed pitch diameter chain driven sprocket mounted on the axle of a bicycle road wheel.

One object of this invention is to provide a non-traction type, infinitely variable external power train ratio within a finite range, which will change the ratio when there is a change in input torque or a decrease in load.

According to the present invention there is provided a variable ratio power transmission comprising a power input, a power output including a drive transmission device having a variable operating diameter to vary the ratio between said input and output, a first drive path interconnecting said input and output to cause rotation of said transmission device and a second drive path interconnecting said input and output to vary the diameter of said transmission device upon application of torque at said input and resilient means to provide a progressive resistance to expansion of said transmission device, said first and second paths being interconnected such that power flows through said second path to expand said transmission device until balanced by said resilient means and subsequently flows through said first path.

Figure 2:
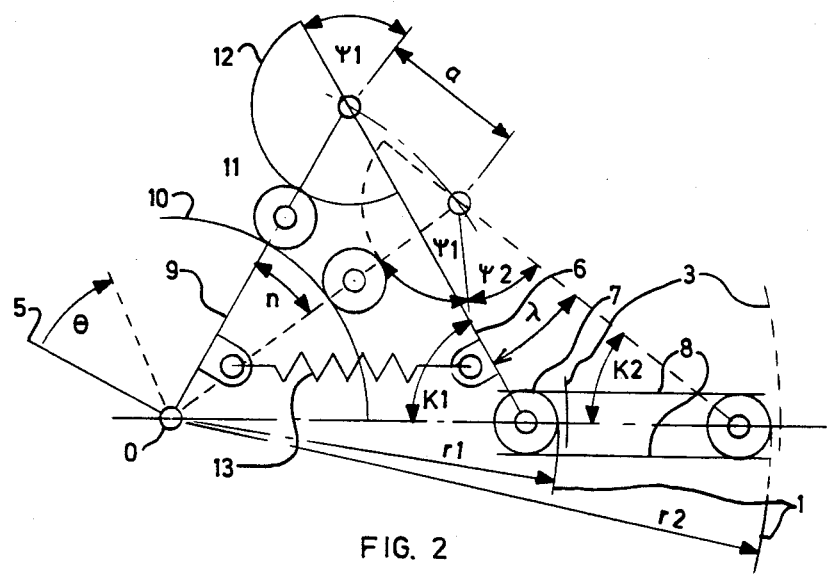
Figure 3:
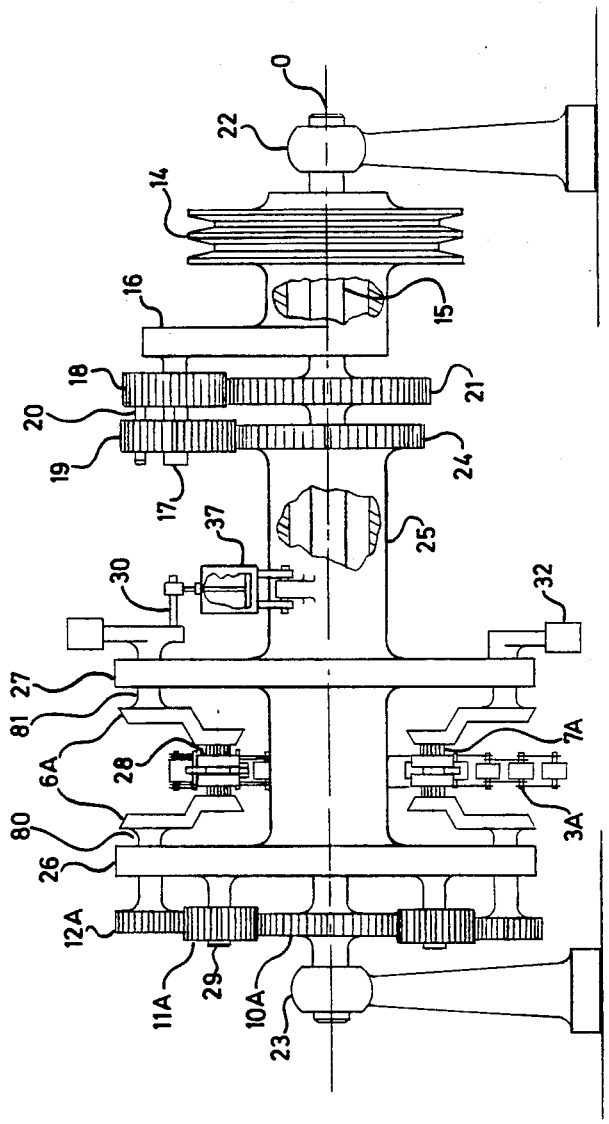
Figure 4:
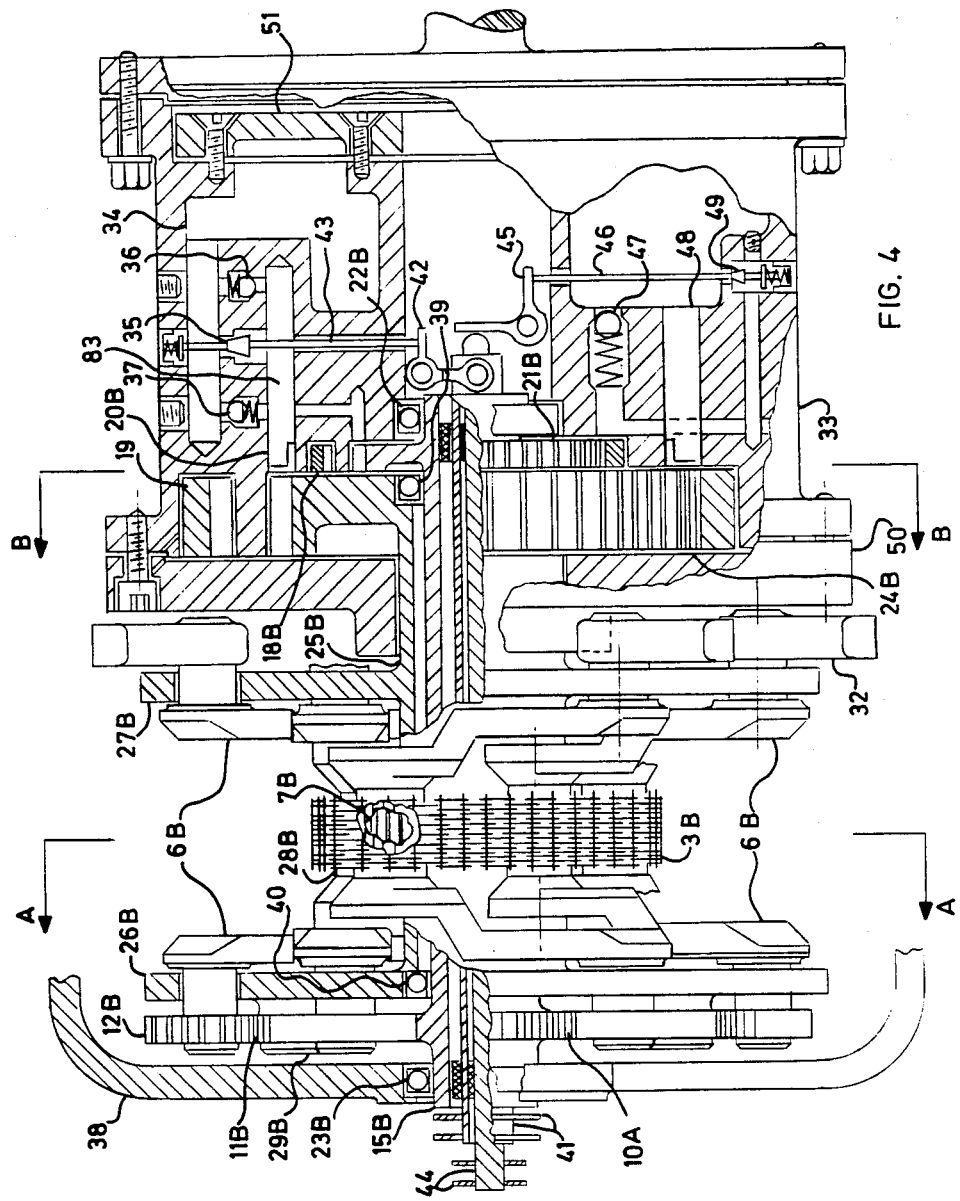
Figure 6:
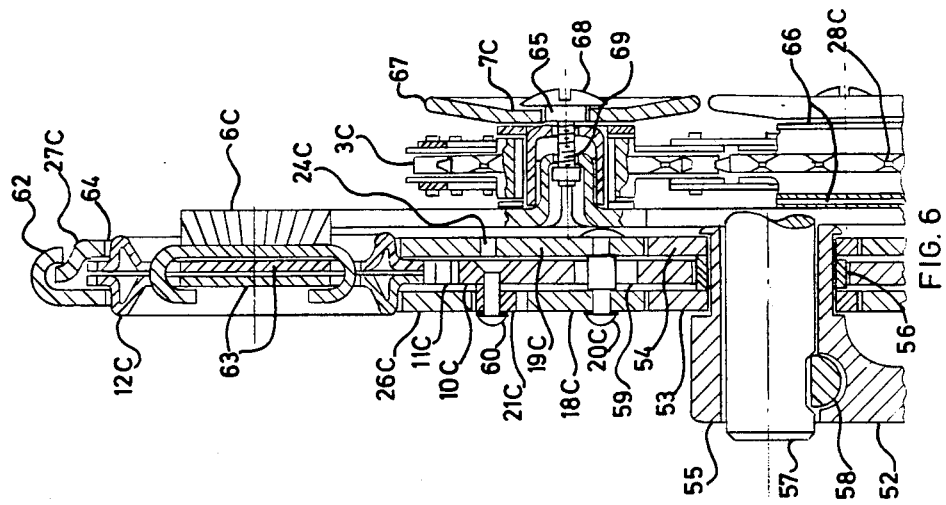
Figure 4A:
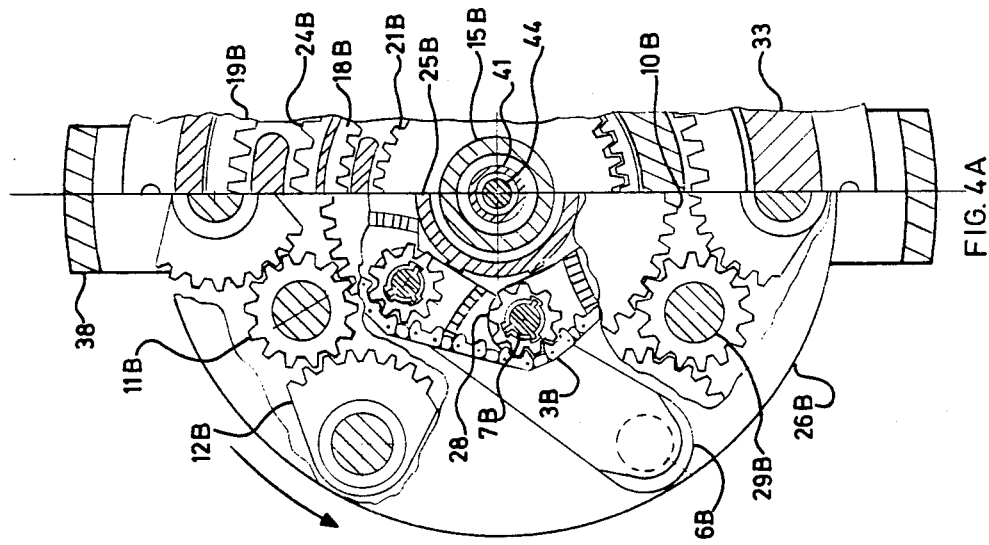
Figure 5:
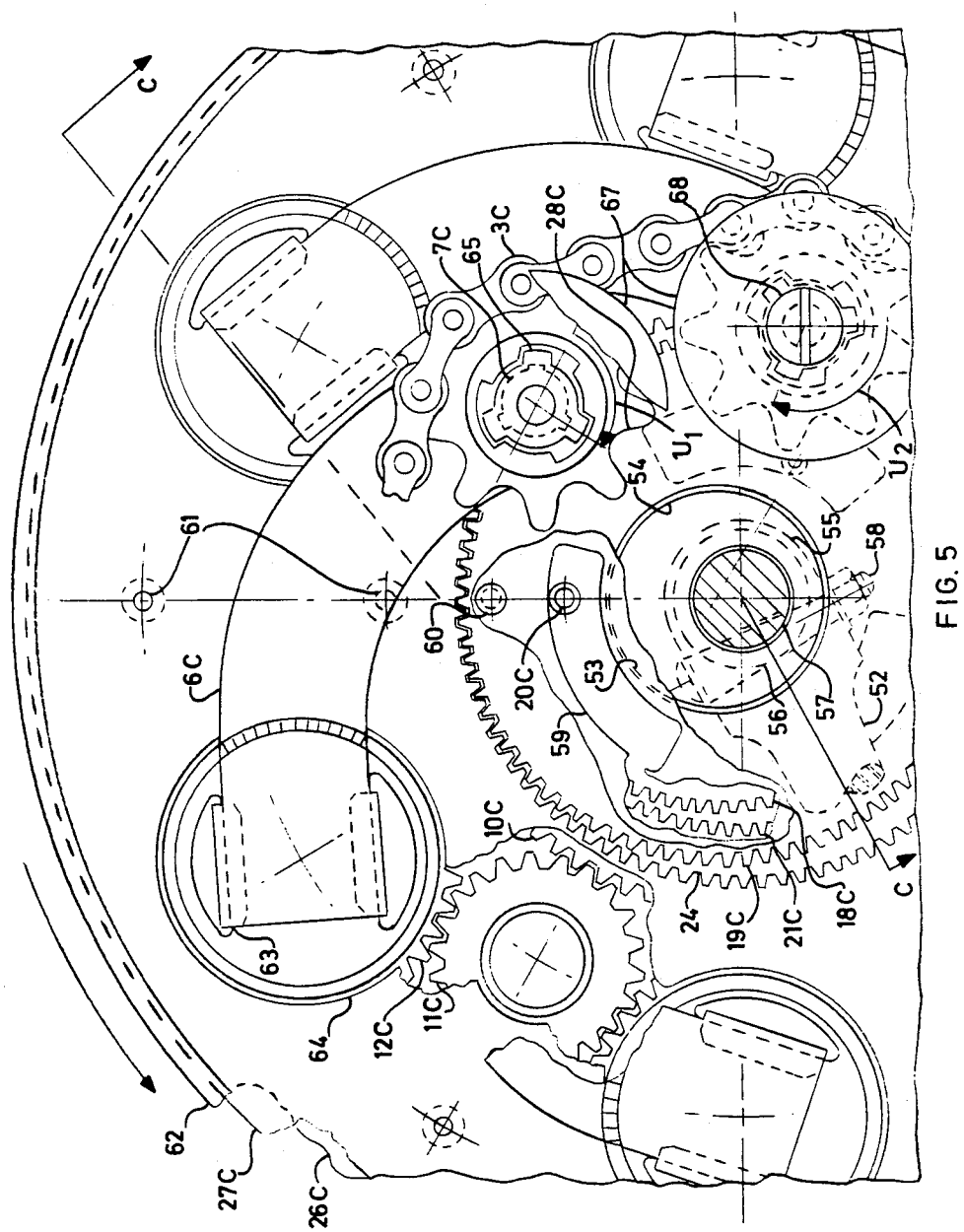

Embodiments of the invention will now be described by way of example only with reference to the accompanying drawings in which:

FIG. 1 is a schematic representation of a conceptual expansible disc,

FIG. 2 is a diagrammatic representation of a slider-crank mechanism used in a variable transmission, FIG. 3 is a side elevation view with three cutaway area of an all-mechanical countershaft transmission, FIG. 4 is a side elevation, partly in section, of a mechanical-hydrostatic (IC) engine mounted transmission, FIG. 4a is a sectional view with the left hand side taken on the line a—a of FIG. 4 and the right hand side taken on the line b—b of FIG. 4, FIG. 5 is a side elevation of a bicycle all-mechanical transmission, FIG. 6 is a section on the line 6—6 of FIG. 5.

Before considering the embodiments shown in FIGS. 3 to 6 the theory of the invention will be described with the aid of the schematic diagrams of FIGS. 1 and 2.

The inventive idea disclosed herein can be better appreciated by considering the following conceptual apparatus.

Work can be done by means of a non-rotative expansible envelope, for example, a cylindrically shaped inflated elastic balloon, if one end of a flexible inelastic element, firmly encircling the middle portion of the outside circumference of the balloon, for example, a string, is glued to the surface of the balloon. Further inflation of the balloon will draw additional string on to the circumference of the balloon, andthereby do mechanical work.

A second method of doing work with the same apparatus would be merely to rotate the balloon on its cylindrical axis in the string-wrapping sense, without further inflation, and thereby do mechanical work.

Mechanical work can therefore be done by the above-described equally-valid methods, herein-after termed:

(a) Non-rotating expansion .... Work path 1
(b) Non-expanding rotation .... Work path 2

A compilation of symbols used in this disclosure is as follows:

| | | |
|---|---|---|
| $\theta$ | Input portion rotative angle | degrees |
| $\phi$ | Angle at $r_2$ of additional chain drawn | degrees |
| $\psi_1$ | Apex of isosceles triangle at $k_1$ | degrees |
| $\psi_2$ | Apex of iso-triangle at $k_2$ minus $U_1$ | degrees |
| $r_1$ | Minimum chainwheel radius | mm |
| $r_2$ | $r_1$ plus an increment | mm |
| 180. | Angle of chain and chainwheel engagement | degree |
| n | Eta, crank 9 incremental rotation | degrees |
| $k_1$ | Kappa, angle of arm 6 a $r_1$ | degrees |
| $k_2$ | Angle $k_1$ minus angle n | degrees |
| $\Lambda$ | Lambda, arm 9 incremental rotation | degrees |
| u | Upsilon, spline line to radial line | degrees |
| @ | Alpha, arc of incremental angle n | mm |

In FIG. 1 a non-rotating disc 1 of variable radius R is provided with a prong 2 fixed to its periphery. A nominally inelastic flexible element 3 with a closed loop 4 at one end is anchored by prong 2 to disc 1. Flexible inelastic element 3 is entrained around about half of the periphery of disc 1 and, except for the loop 4, free to slide on the periphery of disc 1. If variable radius R is increased incrementally from $r_1$ to $r_2$, a lineal quantity of flexible element 3 will be drawn on to the periphery of disc 1 through angle Phi, $\phi$, at final radius $r_2$.

An input torque transmitting torsional element 5 rotates on centre O through incremental angle Theta, $\theta$, in the same rotative sense that flexible element 3 is drawn on to expansible disc 1 to produce the change from $r_1$ to $r_2$, a transmission ratio with useful properties obtains, namely, Theta over Phi, ($\theta/\phi$.)

If disc 1 is an expansible chainwheel, ratio $\theta/\phi$ may be termed, "The Chainwheel Work Path Selection Ratio". If disc 1 is now permitted the additional motion of rotation about centre O, and prong 2 is considered an instantaneous anchor at the point of disengagement of element 3 with disc 1, then (a) if the value of ratio $\theta/\phi$ be less than unity, all input work applied to element 5 would tend to rotate the disc 1, i.e. follow Work path 2, based on the principle that mechanical work will follow the path of least resistance, and disc 1 would not expand, under any input torque condition.

(b) if the value of ratio $\theta/\phi$ is slightly greater than unity, all input work would tend to increase the diameter of the disc, follow Work path 1 to the upper limit of its finite range, if a frictionless means of expansion of the disc 1 were possible, and thereafter rotate the disc 1 i.e. follow Work Path 2, (c) if the value of ratio $\theta/\phi$ is greater than unity by a margin sufficient to overcome all mechanical friction in expanding the chainwheel, all input work would initially expand the disc, i.e. follow work path 1, to the upper limit of its finite range and thereafter rotate the disc 1 i.e. follow Work Path 2.

Value (a) of the ratio $\theta/\phi$ has no practical use in the inventive idea herein disclosed, value (b) has theoretical use in the calculation of ratio boundaries, and value (c) of ratio $\theta/\phi$ has practical use and may be termed, "The Breakout Value of the Chainwheel Work Path Selection Ratio".

The physical means that form Work path 1 of the expansible chainwheel is a force-modifying power train having a ratio $\theta/\phi$ within the range values (c) ratio $\theta/\phi$ herein-after termed, "the internal power train".

A device with an force modifying power train having a value of ratio $\theta/\phi$ falling within the range (c) would have limited practical use because it is merely ratio sensitive, i.e. it will simply expand to its maximum diameter when torque is applied at the input. If an energy storage device, for example, a chain tensioning mechanical spring, is inserted in Work path 1 only, the External Power Train will become sensitive to unbalanced input torque and load conditions caused by a change in input torque or by a decrease in load. This will cause the chainwheel to expand only if the input torque is in excess of the total of the torque requirements of the load, and the spring force and friction of Work Path 1, at any given instant.

The force modifying power train is comprised of three portions in series, an input portion typically torsional element 5, an output portion, including an expansion linkage to vary the diameter of the disc 1, and an intermediate portion, typically an epicyclic gear train, which for simplicity is not shown in FIG. 1, which modifies and transmits force between the input and output portions.

FIG. 2 shows schematically one of a plurality of linkages used in the output to obtain a variable diameter disc 1. The linkages are spaced apart on a common centre O, and act to move a circumferentially spaced wrist pins 7 in radially-directed paths 8. The linkage includes a crank 9 pivotally connected to an arm 6. For a reason explained later, crank 9 is made equal in length to an arm 6.

A spring 13 acts between the crank 9 and arm 6 to bias them toward one another. Each of the pins 7 constitutes one point on the outer surface of the disc 1 so radially outward movement of the pin 7 is effective to increase the diameter of the disc 1. A gear 12 is fixed to arm 6, and a stationary sun gear 10 is mounted on the axis O. An idler gear 11 mounted on crank 9 meshes with gears 10 and 12, and gear 10 is chosen to be twice the pitch diameter of gear 12.

This gear arrangement avoids the need for guides to direct the pin 7 along the radial path 8, which is desirable because of lubrication difficulties and a large side-thrust component force on the guides when the disc 1 is at a minimum diameter. For an isosceles linkage, i.e. the crank 9 and arm 6 of equal length, the value of the ratio of crank 9 rotative angle Eta, n, to resultnt arm 6 rotative angle Psi, $\psi_2$ is constant, $n/\psi_2 = 1:2$, i.e. force-reducing during expansion of the disc 1. This is one reason why an isoscles proportion is chosen for the linkage. The resulting three gear isosceles gear train will also cause a constant value ratio $n/\psi_2$ equal to 1:2. It should be noted that the slider-guide-eliminating gear train is independent of the force modifying power train and, except for friction, does not affect the ratio $\theta/\phi$ in any way.

Because the magnitude of friction forces within the force modifying power train and the chain tensioner are unknown, the minimum practical ratio of $\theta/\phi$ cannot be directly determined. If a frictionless Work Path 1 is assumed, the theoretical Chainwheel Work Path Selection Ratio $\theta/\phi$ is unity and Theta equals Phi.

In FIG. 1, the relationship between additional engaged chain angle $\phi$ and chainwheel radii $r_1$ and $r_2$ for 180 degrees of chain and chainwheel engagement can be shown to be:

$$\phi = 180(r_2 - r_1)/r_2 \qquad \text{EQN (1)}$$

In FIG. 2, the relationship among $(r_2 - r_1)/r_2$, crank 9 rotative angle Eta, n, or arm 6 equal rotative angle Lambda, $\lambda$, isosceles equal base angles Kappa, k, and apex angles Psi, $\psi$, is:

$$(r_2 - r_1)/r_2 = (\cos k_2 - \cos k_1)/\cos k_2 \qquad \text{EQN (2)}$$

$$k_2 = (k_1 - n) \qquad \text{EQN (3)}$$

The output portion ratio $n/\phi$ is sought because the reciprocal ratio $\phi/n$ equals the ratio required for the residual portion of the internal power train, namely, the epicyclic gear train:

$$(\theta/n \times n/\phi) = \theta/\phi = 1 \qquad \text{EQN (4)}$$

combining equations 1, 2 and 3 and dividing both sides of the resulting equation by Eta, n:

$$\theta/n = 180(\cos(k_1 - n))(1 - (\cos k_1)/\cos(k_1 - n))/n \qquad \text{EQN (5)}$$

The isosceles slider crank linkage ratio @/$(r_2 - r_1)$ is variable and force-reducing; between $k_1 = 90$ and 30 degrees, @/$(r_2 - r_1)$ varies between ratio 1:2 and 1:1 respectively. Because the output portion ratio $n/\phi$ includes ratio @/$(r_2 - r_1)$, the epicyclic ratio $\theta/n$ (EQN 5), must be calculated at the maximum force-reducing point, the lower limit of the range wherein $r_1=0$ and $k_1=90$ degrees. If incremental angle n is set equal to 1 degree in equation 5, the value of ratio $\theta/n$ is 3.13:1, force-increasing during expansion of disc 1. This is the minimum theoretical value of the epicyclic gear train ratio which will operate the Internal Power Train and cause the frictionless Work Path 1 to expand the expansible chainwheel.

Operation of the mechanism shown in FIG. 1 requires that the flexible element 3 slide freely on the periphery of the expansible disc 1 at all disc engaged points except the instantaneous anchor, prong 2. Because inertia causes coasting to accompany all work done by Work Path 1 or Work Path 2, and back-driving of input element 5 is considered desirable, prong 2 during back-driving would, in a similar way, be considered an instantaneous anchor at the point of engagement of flexible element 3 with disc 1. Prong 2 would back-drive disc 1 and slack in flexible element 3 would be gathered by the linkage driven by the discharge of energy from the energy storage device 13 when disc 1 is contracting.

This effect can be achieved by means of fixable teeth on the periphery of disc 1 in which some teeth become fixed at the point of disengagement only with element 3 when disc 1 is expanding or, some teeth become fixed at the point of engagement only, with element 3 when disc 1 is contracting.

If flexible element 3 is a power transmission chain and some fixable teeth are fixed teeth on the periphery of discrete peripheral-mounted circular fixable sprockets, and disc 1 is an expansible chainwheel, mere points of engagement and disengagement would require an infinite number of peripheral sprockets. The points may be replaced by engagement and disengagement sectors which permit a finite total number of peripheral sprockets: sectors in which a sprocket would be, respectively, the last to engage or the next to disengage the chain. The sprocket in these sectors and in no other chain-engaged sectors, would drive or be driven by chain 3.

Over the expansible range of the chainwheel, the nominal variable distance between adjacent peripheral sprockets cannot differ from a full number of links by more than half a link. If the peripheral sprockets are free to rotate through one circular pitch, the change in effective chainwheel diameter which occurs in half a coasting revolution of the chainwheel need not substantially exceed one half a chain pitch between any two adjacent sprockets under the practical conditions of three-sprocket chain engagement at any instant.

An all-mechanical first embodiment of this invention is that adapted for use in a countershaft arrangement as shown in FIG. 3. Like components to those described above with reference to FIGS. 1 and 2 will be identified by the same reference numerals with a suffix "a" added for clarity. FIG. 3 shows a front elevation view with three cutaway areas of an expansible chainwheel drive with all means necessary to cause expansion of the chainwheel effective diameter except energy storage device 13, and to limit the rate of contraction of the chainwheel effective diameter when the load back-drives the nominal power source.

The energy storage device shown in FIG. 2 as a mechanical spring 13, acting in tension between crank 9 and arm 6 is in the embodiment of FIG. 3 incorporated with chain 3a as an integral part of the well-known chain tensioning mechanism used to tighten the chain.

The input portion, torsional element 5, in FIGS. 1 and 2 of the Internal Power Train, is, in FIG. 3, comprised of an input pulley 14, freely mounted on stationary but rotatable shaft 15. Fixed to pulley 14 is revolving arm 16 which has a mounting pin 17 fixed near to its radially outer end.

The intermediate portion of the internal power train is a four gear compound epicyclic train including two planetary gears 18 and 19 which are freely mounted on mounting pin 17 and are fixed to each other by drive pin link 20. Gear 18 is meshed with stationary epicyclic sun gear 21. The gear 21 is fixed to stationary shaft 15, which is rotatably mounted in journal bearings 22 and 23. Gear 19 is meshed with epicyclic output gear 24 which is fixed to one end of carrier sleeve 25 freely mounted on shaft 15.

The output portion of the "internal power train" is a plurality of isosceles linkages including two parallel spaced-apart companion flanges 26 and 27 fixed to carrier sleeve 25, in planes normal to the rotational axis of carrier sleeve 25. Rotatively supported on pins 80, 81 between flanges 26 and 27, are a plurality of pairs of circumferentially spaced-apart arms 6a. Respective pairs of arms 6a are joined near one end by splined wrist pin 7a on which is mounted splined centre-apertured sprocket 28 with fixed peripheral teeth. Thus a plurality of sprockets are circumferentially spaced about the periphery of flanges 26, 27. Sprocket 28 is free to rotate on wrist pin 7a through an angle of approximately one tooth circular pitch only. Entrained around a portion of the pitch circle of a substantial number of peripheral sprockets 28 is chain 3a.

A three gear isosceles gear train with fixed ratio of value 1:2 includes an isosceles arm gear 12a attached to the pin 80 on the opposite side of flange 26 to the arm 6a. Arm gear 12a meshes with isosceles idler gear 11a which is free to rotate pin 29 mounted on flange 26. Idler gear 11a meshes with isosceles sun gear 10a, which is fixed to shaft 15.

An eccentric countermass 32 is fixed on the pin 81 on the opposite side of flange 27 to arm 6a. The countermass 32 extends radially outwardly and is aligned with arm 6a. A cranked pin 30 is fixed to the web of countermass 32 and is positively connected to a pivotally mounted pneumatic retarder dashpot 31 that extends between cranked pin 30 and carrier sleeve 25.

The sequence of operation of this countershaft embodiment of this invention is as follows:

Initially the sprockets 28 are at a minimum diameter so that a numerically low ratio between input and output is obtained. If torque is sufficient, v-belts rotate pulley 14, which in turn rotates arm 16 about shaft 15 and moves mounting pin 17 in a circular pattern. Pin 17 orbits gear 18 around stationary sun gear 21 and the rotation of gear 18 is transmitted through drive pin link 20 to rotate gear 19 on mounting pin 17. The difference in diameter between the gears 18, 19 causes a differential rotation of output gear 24 and carrier sleeve 25, preferentially in the opposite sense to rotation of pulley 14. Its flanges 26 and 27 rotate with gear 24, the arm gear 12a and idler gear 11a are orbited around stationary isosceles sun gear 10a. Idler gear 11a, meshed with gear 10a and gear 12a, causes gear 12a to rotate on its own centre sprockets 28 which swings the arms 6a outward. By this combined motion, sprockets 28 are urged outward in radial paths, thereby drawing chain 3a on to the expanding chainwheel circumference.

If the load on chain 3 is increased or input torque decreased, outward movement of the arms 6 stalls, causing the rotation of pulley 14 to be transmitted to the shaft 15. All components supported by journal bearings 22 and 23 rotate at the same speed as shaft 15 causing all work to be done through Work Path 2 with a ratio determined by the final radial position of the sprockets 28.

If the speed of input pulley 14 is decreased, tension in chain 3a urges sprockets 28 inward in radial paths to decrease the drive ratio. This motion is retarded by pneumatic dashpot 31, therefore back-driving occurs without an abrupt increase in input pulley 14 speed.

If the speed of input pully 14 is decreased, inertial tension in chain 3a urges sprockets 28 inward in radial paths to decrease the drive ratio. This motion is retarded by pneumatic dashpot 31, therefore back-driving occurs without an abrupt increase in input pulley 14 speed.

If the speed of carrier sleeve 25 is equal to the speed of the input pulley 14, only coasting occurs, and no substantial work is done through Work Path 2.

If a high inertia load, for example, a railway train, is drawn by a locomotive powered by an engine which must be started without load, for example, an IC, compression-ignition engine, a friction-type clutch would be unsatisfactory. If a hydrokinetic clutch is placed between the IC engine and the expansible chainwheel drive shown in FIG. 3, clutch heat dissipation would be improved, but this method incurs either continuous fluid turbulence losses, or mechanical lock-up facilities and more complex controls.

A simpler method is shown in FIGS. 4 and 4a in which the intermediate components have been modified to include hydrostatic circuitry which provides, in addition to ratio change, IC engine clutching, engine overload protection, and control of the rate of chainwheel contraction during back-driving by the load. Like components to those described above will be denoted by similar reference numerals with a suffix added for clarity.

The rigid pin link 20 shown in FIG. 3 is replaced by a disconnectable hydrostatic link 20b, FIG. 4, and the four gear compound epicyclic gear train, (18, 19, 21, 24 in FIG. 3) is modified to form a four-gear hydrostatic drive, for example, a crescent-type gear pump and pump-motor of the gear-in-gear class. With this arrangment pumping losses would be greatest when the railway train is stationary and the IC engine idling, and least when the train is at balancing speed and all work is done throuqh Work Path 2.

Described in Work Path 1 mode, FIGS. 4 and 4a show side and end elevations respectively with cutaway sectional views, including all means necessary except spring 13, FIG. 2, to cause chainwheel expansion, and retardation of chainwheel contraction during engine back-driving. The direction-of-rotation arrow shown in FIG. 4a is the enqine output flange rotation.

All hydraulic elements are carried in a common housing 33, fixed to the rotating power output flange of the engine. A small diameter, small tooth-face area, stationary gear 21b is fixed to stationary but rotatable hollow shaft 15b and meshed with internal ring gear 18b forming a small volume-per-revolution, high pressure crescent gear pump with its inlet connected to a rotating fluid reservoir 34 through check valve 47. The output is joined to disconnectable header 83 of hydrostatic link 20b. A large pitch diameter, large tooth-face area, output gear 24b is fixed to carrier sleeve 25b and meshed with internal ring gear 19b forming a large volume-per-revolution, low pressure crescent gear pump-motor also connected to header 83 of link 20 and connected to reservoir 34 through unrestricted passage 48. Connecting header 83 to reservoir 34 is power engaging valve 35. By-passing power engaging valve 35 is pressure relief valve 36 and vacuum-breaker check valve 37. By-passing check valve 47 is chainwheel contraction retarder, back-driving valve 49.

Stationary but rotatable hollow shaft 15b is mounted in two journal bearings 22b and 23b. One bearing 22b is supported in housing 33 and the other bearing 23b is supported by frame extension 38 of the engine crankcase. Carrier sleeve 25b is supported on hollow shaft 15b by two journal bearings 39 and 40. Concentrically mounted within hollow shaft 15b and rotating with housing 33, with means for axial movement, is shifting collar and sleeve 41, which actuates fork 42 and power-engaging valve stem 43. Mounted within shifting collar and sleeve 41, and free to rotate with housing 33 is axially movable shifting collar and rod 44, operating bell crank 45 and back-driving valve stem 46. A cover plate 50 and cover ring 51 hydraulically seals housing 33.

Companion flanges 26b and 27b paired arms 6b, splined wrist pin 7b, sprocket 28b, arm gear 12b, idler gear 11b, idler pin 29b arm countermass 32b silent chain 3b and stationary isosceles sun gear 10b are arranged substantially as described for FIG. 3.

The difference in pitch diameter of gears 21b and 24b is so chosen that, notwithstanding the common input torque to both pump and pump-motor, the high pressure pump will have sufficiently higher net pressure to cause the low pressure pump-motor to operate as a motor under Work Path 1 conditions.

The difference in net fluid volume-per-revolution between the pump and pump-motor is so chosen that the hydraulic ratio between them is, less slippage, equivalent to the mechanical ratio provided by the epicyclic Gear Train described for FIG. 3.

The sequence of operation of the mechanical-hydrostatic embodiment shown in FIG. 4 is as follows:

The IC engine is started with power-enqaging valve 35 open, and rotation of housing 33 causes fluid to be drawn from reservoir 34, flow through both pump and pump-motor in parallel to discharge into header 83 to return to reservoir 34 through open valve 35. Gears 21b and 24b remain stationary and no substantial force be transmitted to chain 3b.

When power-engaging valve 35 is closed, fluid pressure rises in header 83 and torque appears at gears 21b and 24b. If the transient load is excessive, pressure relief valve 36 opens and some energy is dissipated by pumping losses until the starting load force equals the seating force of the spring in relief valve 36. All elements of the expansible chainwheel then rotate in unison and all work is done through Work Path 2 at the lower limit of the expansible range. If engine torque is increased above load demand, the high pressure pump causes the low pressure pump to motor, relative motion occurs between gears 21b and 24b, and fluid discharges through unrestricted passage 48 to reservoir 34. The chainwheel thereby expands and work is done through Work Path 1 to the upper limit of the range.

If the engine speed is less than load speed, reverse relative motion occurs between gears 21 and 24, but only at the rate that fluid is permitted to flow in series from reservoir 34, through the low pressure pump-motor and the high pressure pump to reservoir 34, by the orifice setting of back-driving valve 49.

Controlled contraction of the chainwheel permits of engine braking of the load at nearly constant engine speed within the limits of the expansible range. Flow control devices are arranged in FIG. 4 for maximum clarity of function and, in practice, would be so positioned that centrifugal force is minimum on movable components.

An all-mechanical third embodiment of this invention is that adapted for use in a man-powered vehicle arrangement. FIG. 5 shows a front elevation with cut-away areas and a cross-sectional end view of the expansible chainwheel drive with all means necessary except chain-mounted spring 13, to cause expansion of the effective diameter of the chainwheel within the limits of the expansible range.

The input portion of the internal power train in the embodiment of FIG. 5 includes:

a pedal connected to pedal crank 52 which has a hub 55 fixed to rotatable hanger shaft 57 by cotter pin 58. Fixed to hub 55 are two spaced-apart equal throw eccentrics 53 and 54. The crank 52 is disposed at 180° to the maximum throw of eccentrics 53 and 54 and mounted between the eccentrics 53 and 54 and fixed to hub 55 is journal ring 56.

The intermediate and output portions of the Internal Power Train includes a stationary isosceles sun gear 10c rotatively and concentrically mounted on journal ring 56 and supported between eccentrics 53 and 54. Two spaced-apart companion carrier flanges 26c and 27c are separated by and laterally supported by sun gear 10c. One flange 26 is concentrically and rotatively mounted on the outside diameter of a circular shoulder fixed to one side of sun gear 10. Carrier flanges 26 and 27 are fixed to each other and laterally spaced apart by carrier shouldered drive pins 61 and crimped and offset interlocked outside edges 62 of carrier flanges 26c and 27c.

A plurality of idler gears 11c circumferentially spaced apart about the rotative centre of shaft 57 are rotatively mounted between carrier flanges 26c and 27c. A plurality of arm gears 12c circumferentially spaced apart about the rotative centre of shaft 57 are rotatably mounted between carrier flanges 26c and 27c. Each idler gears 11c meshes with two arm gears 12c and sun gear 10c. Formed in the web of arm gear 12c are two spokes 63, radially positioned 180 degrees apart on arm gear 12 centre. Spokes 63 are encompassed by a male journal bearing rotatively supported within two female journal bearings 64, let into carrier flanges 26c and 27c. For ease of assembly, bearing 64 is of a diameter that will pass through sprocket 28. Arm 6 is fixed near one end to arm gear 12c by capturing lugs of arm 6c formed around the edges of spokes 63. The teeth of pitch gear 12, spokes 63, and the male journal bearing, of arm gear 12, are preferentially formed by two inward-facing identical stampings fixed together by arm 6c capturing lugs. Near the other end of arm 6c is formed an outward-facing boss 7c. Formed on boss 7c are symmetrically spaced-apart splines. Encompassing and fixed to splined boss 7c is mating splined replaceable thimble 65. Orientation of the splines formed on the boss 7c relative to the arm 6c on which boss 7c is formed, is substantially different for each arm 6c. Encompassing thimble 65 is a centre-apertured peripheral circular sprocket 28c. Mating splineways in the centre aperture are substantially wider than the spline widths of thimble 65. On each side of the hubs of sprocket 28c is one non-rotating internally splined washer 66. Limiting axial movement of outer washer 66 is chain guard flange 67, a retaining shouldered bolt 68 and nut 69 centrally locates and captures flange 67, boss 7, thimble 65 and washers 66. Entrained around a portion of the pitch circle of approximately three peripheral sprockets 28 is chain 3c. The intermediate portion of the Internal Power Train is an epicyclic compound gear train comprised of: two planetary gears 18c and 19c. Gear 18c is rotatably mounted on the outside diameter of eccentric 53 and gear 19c is rotatably mounted on the outside diameter of eccentric 54. Gears 18c and 19c are laterally supported and separated by the web of isosceles sun gear 10c. Gears 18c and 19c are fixed to each other and spaced apart by three shouldered link pins 20c, line pins 20c connect gears 18c and 19c through interspoke apertures 59 let into the web of stationary isosceles sun gear 10c. Concentrically fixed to one side of the web of gear 10c and meshed with planetary gear 18c is an internally toothed epicyclic sun ring gear 21c. The outside diameter of gear 21c is the circular shoulder which rotatably supports flange 26c. Formed on the inside diameter of carrier flange 27c is an internally toothed epicyclic output gear 24c which meshes with planetary gear 19c.

The sequence of operation of the man-powered embodiment shown in FIG. 5 is as follows:

If input torque in pedal crank 52 exceeds the total of load, friction and spring torque in Work Path 1, and the expansible chainwheel is not at the upper limit of its range, hub 55 rotates eccentrics 53 and 54 on each side of stationary isosceles sun gear 10c. Eccentric 53-drives planetary gear 18c which meshes with stationary epicyclic sun gear 21c. The sun gear 18c rotates on its centre and pins 20c causes eccentric 54 to rotate and drive planetary gear 19c in unison with gear 18c. Planetary gear 19c meshes with epicyclic internal output gear 24c and causes gear 24c and thereby rear carrier flange 27c to rotate relative to stationary isosceles gear 10c in the opposite sense to the rotation of pedal crank 52. Flange 27c rotates front flange 26c by means of shouldered pins 61 and interlocked outside edges 62. Flanges 26c and 27c orbit idler gears 11c and arm gears 12c around stationary gear 10c and idler gears 11c rotate arms 12. The resulting combined motion causes bosses 7c to move in radially outward paths. Sprocket 28c in the disengagement sector is locked to thimble 65, and additional chain 3 is drawn on to the periphery of the expanding chainwheel.

On bicycles fitted with a reverse free-wheeling road wheel rear driven sprocket, chainwheel contraction be obtained by means of inertia and a rapid back-pedal action by the cyclist. If the rear driven sprocket is fixed to the road wheel, the retarding action of dashpot 31, FIG. 3, may be obtained by means of a modified gas spring, swivel-mounted between sun gear 21 and carrier front flange 26, and arranged to go by pedal arm 52.

While the preferred embodiments of this invention have been disclosed herein, it will be obvious to those skilled in the art, that changes, modifications and combinations may be made without departing from the spirit and cope of this invention as defined in the appended claims.

To fix the peripheral sprocket and thereby the fixable teeth in the chain engagement or disengagement sectors only, the orientation of the splines on thimble 65, relative to a straiqht line through the chainwheel rotative centre 0 and the thimble 65 centre, is substantially different for each thimble. Because the thimble 65 is mounted on arm 6, this orientation can be more conveniently considered relative to a straight line through arm gear 12c centre and thimble 65 centre, and its angle to a straight line passing centrally through one spline and thimble 65 centre of the same arm. This angle increases at a uniform rate in a clock-wise direction from arm 6c line to the central spline when proceeding around the stationary chainwheel in a clock-wise direction until one circuit is completed. Thus, in FIG. 5, angle Upsilon, $u_2$ is greater for rotatively trailing arm 6c than angle $u_1$ for rotatively leading arm 6c.

For example, if a total of six peripheral sprockets are uniformly spaced apart around the periphery of an expansible chainwheel, the engagement or disengagement sectors will occupy 360°/6=60 degrees each. If the peripheral sprockets each have 9 teeth uniformly spaced around the sprocket pitch circle, one circular pitch lost motion will be 360°/9=40 degrees of sprocket rotation. If the number of uniformly spaced lost-motion splineways within the centre apertured sprocket is 3, the splineways can be symmetrically related to the 9 teeth on the pitch circle of the peripheral sprocket. The mating splines on the thimble is uniformly spaced at 360°/3=120 degrees. If one spline width occupy 30 degrees, each thimble spline orientation can differ from adjacent thimbles by (120°−30°)/6=15 degrees.

Thus, the regressive relationship between splined thimble 65 and arms 6 when sprocket 28 drives chain 3, becomes a progressive relationship when chain 3 drives sprocket 28.

I claim:

1. A variable ratio power transmission comprising a power input, a power output including a drive transmission device having a variable operating diameter to vary the ratio between said input and output, a first drive path interconnecting said input and output to cause rotation of said transmission device and a second drive path interconnecting said input and output to increase the diameter of said transmission device upon application of torque at said input in a first rotative sense and to decrease the diameter of said transmission device upon application of torque at said input in a second rotative sense opposite to said first rotative sense and resilient means to provide a progressive resistance to expansion of said transmission device, said first and second paths being interconnected such that power flows through said second path to expand said transmission device until balanced by said resilient means and subsequently flows through said first path, said input being connected to both said first and second drive paths by a torque transmitting device providing a mechanical advantage to said second path over said first path.

2. A transmission according to claim 1 wherin said transmission device is rotatable about a central axis and includes a plurality of arms each swingable radially outwardly relative to said central axis to increase the diameter of said transmission device upon power flowing through said second path.

3. A transmission according to claim 2 wherein each of said arms carries a sprocket engageable with a flexible inextensible member entrained about said sprockets, said flexible inextensible member being moveable upon rotation of said transmission device and upon expansion thereof.

4. A transmission according to claim 3 wherein each of said sprockets is mounted on said arm for limited rotational movement relative thereto, each of said arms including stop means providing an abutment for said sprocket at the boundaries of said limited rotational movement, each of said stop means having a substantially different orientation relative to the respective arms so as to accommodate changes in spacing between adjacent sprockets as said transmission device changes diameter.

5. A transmission according to claim 4 wherein retarding means are operable upon said arms to retard movement of said arms in a direction to reduce the diameter of said transmission device.

6. A transmission device according to claim 2 wherein said torque transmitting device is an epicyclic gear train to provide said mechanical advantage, said arms being moved radially outwardly upon relative movement between components of said gear train associated respectively with said first and second drive paths.

7. A transmission device according to claim 6 wherein said arms are mounted on a carrier rotatably mounted on an input drive member and said gear train acts between said arms and said input drive member to cause radial movement of said arms upon relative rotation between said carrier and said input drive member.

8. A transmission device according to claim 7 wherein said gear train includes a first gear connected to said input drive member, a secured gear mounted on each of said arms and a third gear rotatably supported on said carrier in torque transmitting relationship with said first and second gears to cause movement of said arms upon relative movement between said carrier and input drive member.

9. A transmission device according to claim 1 wherein said first and second drive paths are interconnected by a hydraulic transmission.

* * * * *